United States Patent [19]

Estop et al.

[11] Patent Number: 5,387,890
[45] Date of Patent: Feb. 7, 1995

[54] SUPERCONDUCTIVE COIL ASSEMBLY PARTICULARLY FOR A CURRENT LIMITER, AND A CURRENT LIMITER INCLUDING SUCH A COIL ASSEMBLY

[75] Inventors: Pascal Estop, Vitry-sur-Seine; Thierry Verhaege, Saulx les Chartreux; Van Doan Pham, Meyzieu; Alain Lacaze, Essert; Christian Cottevieille, Montreuil, all of France

[73] Assignees: GEC Alsthom T & D SA; GEC Alsthom Electromecanique SA, both of Paris, France

[21] Appl. No.: 145,634

[22] Filed: Nov. 4, 1993

[30] Foreign Application Priority Data

Nov. 5, 1992 [FR] France .................. 92 13317
Aug. 27, 1993 [FR] France .................. 93 10300

[51] Int. Cl.$^6$ ............ H01F 1/00; H01F 36/00; H02H 7/00; H01H 47/00
[52] U.S. Cl. .................... 335/216; 336/DIG. 1; 361/19; 361/141; 323/360; 338/32 S
[58] Field of Search ............ 335/216; 336/DIG. 1; 361/19, 141; 323/360; 338/325; 174/125.1

[56] References Cited

U.S. PATENT DOCUMENTS

| | | | |
|---|---|---|---|
| 3,527,873 | 9/1970 | Brechna | 174/125.1 |
| 4,760,365 | 7/1988 | Bailey et al. | 335/216 |
| 4,910,626 | 3/1990 | Collet | 361/19 |
| 5,153,804 | 10/1992 | Pham | 361/19 |
| 5,168,125 | 12/1992 | Verhaege | 174/125.1 |
| 5,204,650 | 4/1993 | Nemoto | 335/216 |
| 5,225,957 | 7/1993 | Tsurunaga | 361/19 |
| 5,250,508 | 10/1993 | Pham | 505/1 |

FOREIGN PATENT DOCUMENTS

| | | | |
|---|---|---|---|
| 1479481 | 5/1967 | France | 174/125.1 |
| 0015804 | 1/1987 | Japan | 174/125.1 |
| 0026328 | 1/1989 | Japan | 361/19 |
| 0198224 | 8/1989 | Japan | 361/19 |
| 0198227 | 8/1989 | Japan | 361/19 |
| 0214223 | 8/1989 | Japan | 361/19 |
| 0286730 | 11/1989 | Japan | 361/19 |
| 4104408 | 4/1992 | Japan | 174/125.1 |
| 1230579 | 5/1971 | United Kingdom | 361/19 |

OTHER PUBLICATIONS

Journal of Materials Science, No. 26, Jan. 1991, London, Great Britain, pp. 145–154, Shrout et al: "Composite PCTR thermistors utilizing conducting borides, silicides, and carbide powders".

*Primary Examiner*—Leo P. Picard
*Assistant Examiner*—Stephen T. Ryan
*Attorney, Agent, or Firm*—Sughrue, Mion, Zinn, Macpeak & Seas

[57] ABSTRACT

The present invention relates to a superconductive coil assembly which may be used particularly for a current limiter, the coil assembly comprising a plurality of coaxial cylindrical coils electrically connected in series, each coil comprising two windings of superconductive material electrically connected in parallel, arranged coaxially and wound in opposite directions, wherein in each coil, the windings are separated by a material which has a surface resistance in the radial direction lying in the range $10^{-5}$ $\Omega.m^2$ to $10^{-2}$ $\Omega.m^2$ at the temperature of the cryostat, and in which the strands which constitute the superconductive wires may themselves be covered with a layer of the same material.

3 Claims, 4 Drawing Sheets

SUPERCONDUCTIVE COIL ASSEMBLY PARTICULARLY FOR A CURRENT LIMITER, AND A CURRENT LIMITER INCLUDING SUCH A COIL ASSEMBLY

The present invention relates to a coil assembly which may be used particularly for constructing a current limiter.

BACKGROUND OF THE INVENTION

It is known, in particular from European patent application no. 0 336 337, to construct a superconductive limiter by using a coil placed in a cryostat, the coil comprising two coaxial windings of superconductive material wound in opposite directions.

In order to increase the power of the limiter, it has been suggested that a coil assembly may be constructed from a plurality of coils of the aforementioned type physically disposed coaxially and electrically connected in series.

The problem arises in such a coil assembly of providing insulation between each of the windings, for each of the constituent coils.

If the windings are to be insulated from one another, it is necessary to use an insulating layer capable of withstanding a very high voltage. Assuming that one of the windings has a region in which the superconductive state disappears to be replaced by the normal state (this region is henceforth designated as the transition region), then a significant electric voltage is developed between the transition region and the adjacent region of the other winding. If there is insufficient insulation, the voltage may give rise to a breakdown between windings. However, good insulation presupposes a thick layer which will increase significantly the volume occupied by the coil assembly. Moreover, this electrically insulating layer also acts as a heat insulator, so that the heat generated in the region of the winding which is in transition cannot easily be transmitted to the adjacent region of the other winding, whose own transition may lag behind.

OBJECTS AND SUMMARY OF THE INVENTION

An object of the present invention is to provide partial insulation between two windings which avoids insulation breakdown and which is not of significant bulk.

According to the invention, the windings of a coil assembly are separated by a material which has a surface resistance in the radial direction lying in the range $10^{-5}$ $\Omega.m^2$ to $10^{-2}$ $\Omega.m^2$ at the temperature of the cryostat.

In a variant, the windings are constructed using superconductive wires each comprising a plurality of strands, each strand being covered with a layer of material which has a resistivity in the radial direction lying in the range 0.1 $\Omega.m$ to 10 $\Omega.m$.

Advantageously, the insulation is constituted by a polymer matrix reinforced with carbon black.

In a variant, the insulation is constituted by carbon fibers impregnated with a polymer resin.

BRIEF DESCRIPTION OF THE DRAWINGS

The invention will be better understood from the description of one embodiment of the invention, with reference to the accompanying drawings in which.

MORE DETAILED DESCRIPTION

Figure 1:
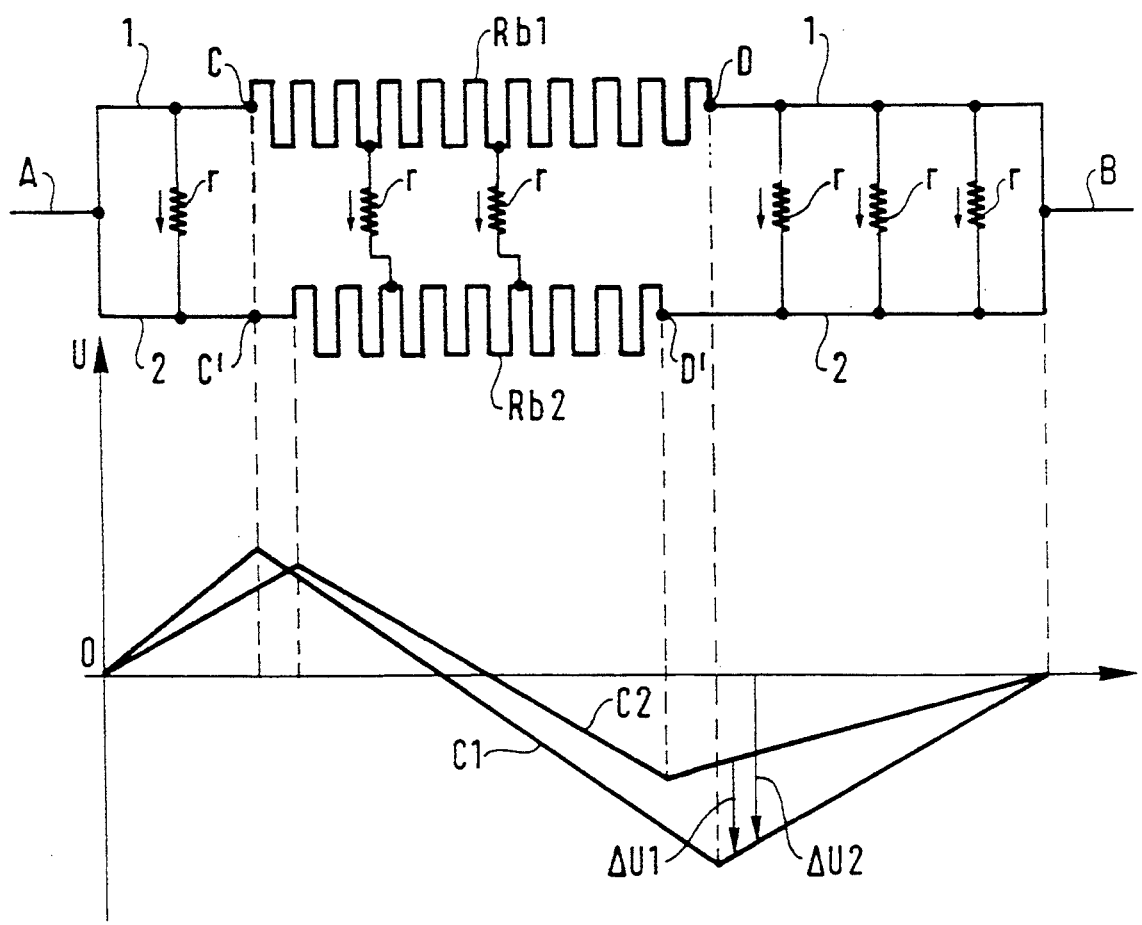
FIG. 1 is a diagram which explains the problems posed by the insulation between the windings of a superconductive coil with two windings.

The lines 1 and 2 in FIG. 1 represent respectively the two windings of a single coil, connected in parallel at points A and B.

It is assumed that winding 1 undergoes a transition from the superconductive state to the normal state in the portion CD; this is illustrated in the Figure by the resistance Rb1 between points C and D. The voltage in the region CD is illustrated by the curve C1 in the figure.

If winding 2 remains in the superconductive state, the potential difference $\Delta U2$ between windings 1 and 2 may attain high values which can cause breakdown of the insulation between the windings.

If, in accordance with the invention, the layer between the windings 1 and 2 is not a perfect insulator, as symbolized in FIG. 1 by distributed resistances r a transition of a portion CD of winding 1 causes an almost simultaneous transition of a substantially adjacent portion C'D' of winding 2, due to heating by the current transferred from winding 1 to winding 2, this being represented in the Figure by the resistance Rb2 between points C' and D'. This heating acts simultaneously on the two windings, so that the regions in transition CD and C'D' then expand rapidly to reach AB.

The voltage of the winding 2 in the region C'D' during transition is represented by the curve C2 in FIG. 1. It can be seen that the potential difference $\Delta U1$ between the two regions CD and C'D' during transition is markedly less than the value $\Delta U2$, thus avoiding any risk of the insulation between the windings 1 and 2 breaking down.

Figure 2:
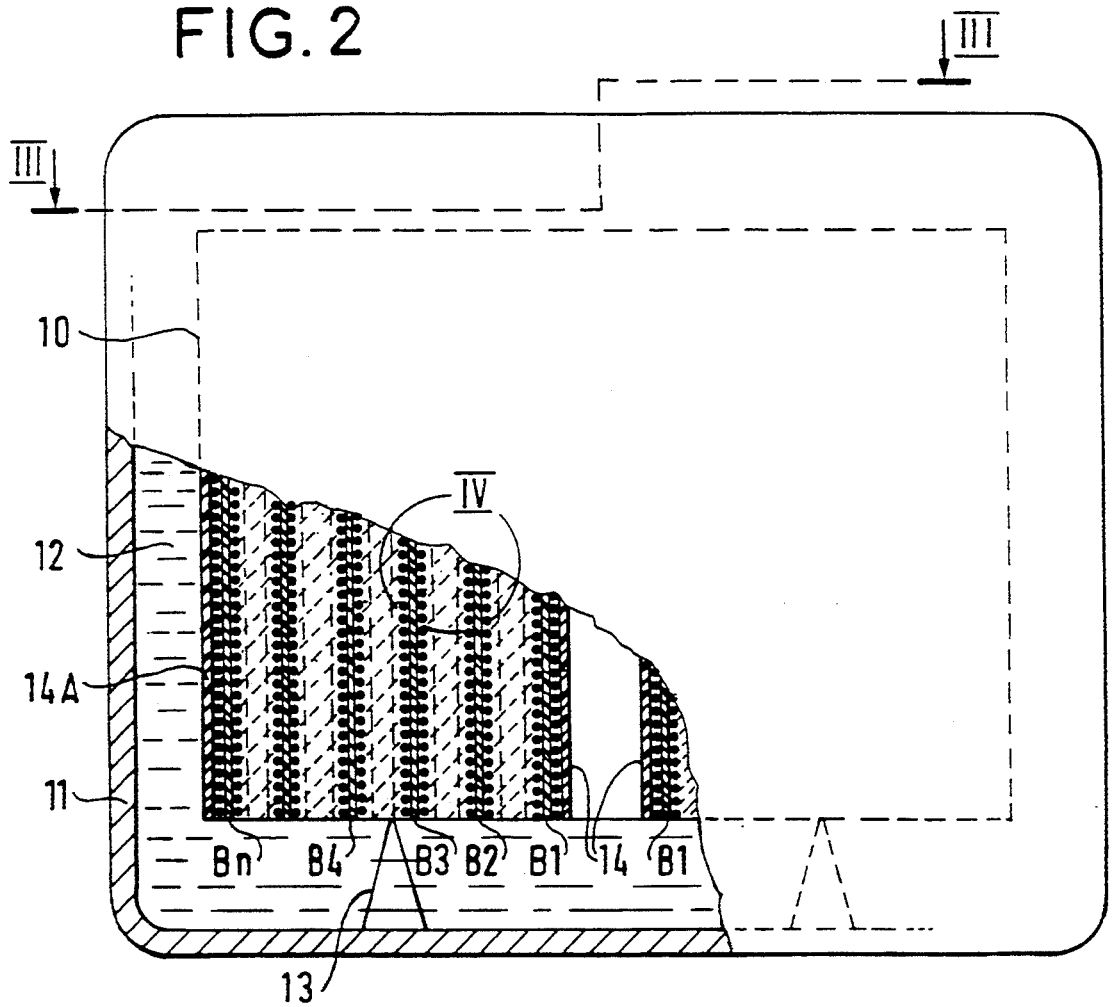
FIG. 2 is a schematic vertical view partly in section of a coil assembly according to the invention placed in a cryostat.

FIG. 2 is a vertical view partly in axial section of a coil assembly 10 in accordance with the invention placed in a cryostat 11 filled with a cryogenic liquid 12 such as liquid helium. The coil assembly rests on insulating supports 13. The feed throughs of the cryostat, which do not form part of the invention, have not been shown.

Figure 3:
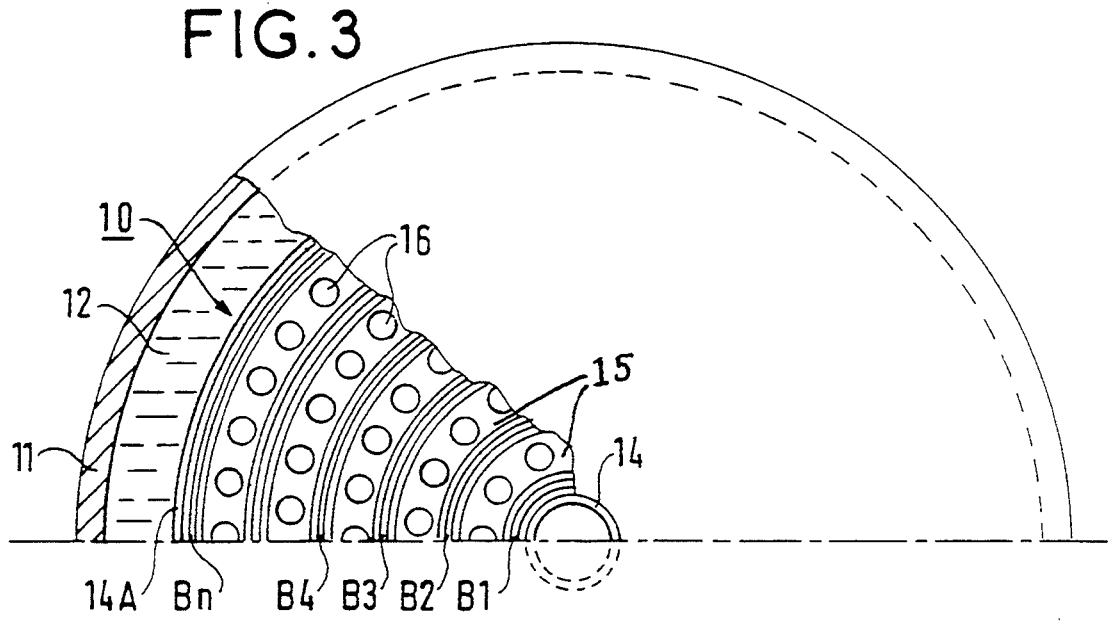
FIG. 3 is a part sectional view along the line III—III of FIG. 2.

As previously explained, and as illustrated in FIG. 3, the superconductive coil assembly 10 of the invention comprises a plurality of coaxial cylindrical coils B1, B2, . . . Bn, electrically connected in series. The coil B1 of smallest diameter is wound on a mandrel 14; The other coils are formed by windings around cylindrical spindles between which a polymerizable resin 15 is injected; the last coil Bn is if necessary surrounded by a mandrel or retaining ring 14A of an insulating material; the spindles are then removed, their locations defining channels 16 through which the cryogenic liquid can flow.

Figure 4:
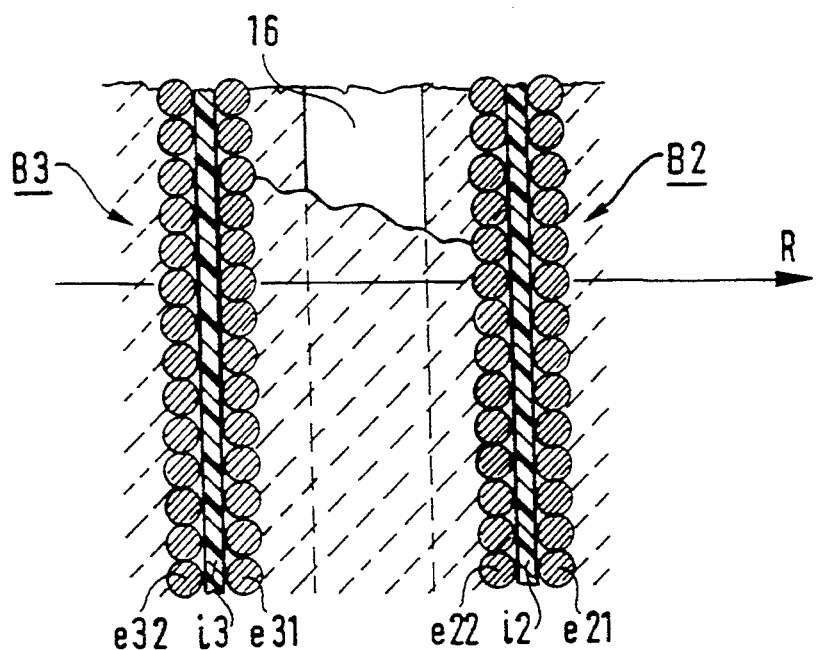
FIG. 4 is an enlarged view of part of FIG. 2

FIG. 4 shows an enlarged portion IV of FIG. 2.

A portion of coil B2 and a portion of coil B3 can be seen in FIG. 4. Coil B2 comprises two windings e21 and e22 wound with touching turns, the windings being in opposite directions so as to reduce the self-inductance; the windings are for example constituted by:
- a 7-strand wire, comprising 6 strands of niobium-titanium compacted around a resistive strand constituting a central core,
- or a sheet comprising several (for example, 8) 7-strand wires,
- or a bar of the Roebel type constituted by an assembly of transposed 7-strand wires.

These examples are in no way limiting.

The windings e21 and e22 are separated by a layer i2 of a material which, in accordance with an essential feature of the invention, is not a perfect insulator, but is a material having a surface resistance in the radial direction lying in the range $10^{-5}$ $\Omega.m^2$ to $10^{-2}$ $\Omega.m^2$ at the temperature prevailing in the cryostat. Such a material may, for example, be a polymer matrix reinforced with carbon black or any other material having the same resistivity range under the aforementioned conditions of use.

Coil B3 is constituted in an identical manner by two windings e31 and e32 separated by an insulating layer i3.

By way of example, in order to provide a current limiter at the nominal voltage of 63 kVrms and at the nominal rms current of 1250 amps, the coil assembly comprises of the order of 25 coils; the wires have a thickness of about 0.5 mm and the thickness of the partial insulation between the windings of a coil is about 0.3 mm. This partial insulation is, for example, a polymer matrix reinforced with carbon black having a resistivity of 1 $\Omega.m$ at the temperature of liquid helium, which gives, for a thickness of 0.3 mm, a surface resistance in the radial direction of $3*10^{-4}$ $\Omega.m^2$. A similar result may be obtained by using carbon fiber in the form of a cloth, and impregnated with a polymer resin after winding. In practice, the surface resistance in the radial direction may be chosen to lie in the range $10^{-5}$ $\Omega.m^2$ to $10^{-2}$ $\Omega.m^2$.

Figure 5:
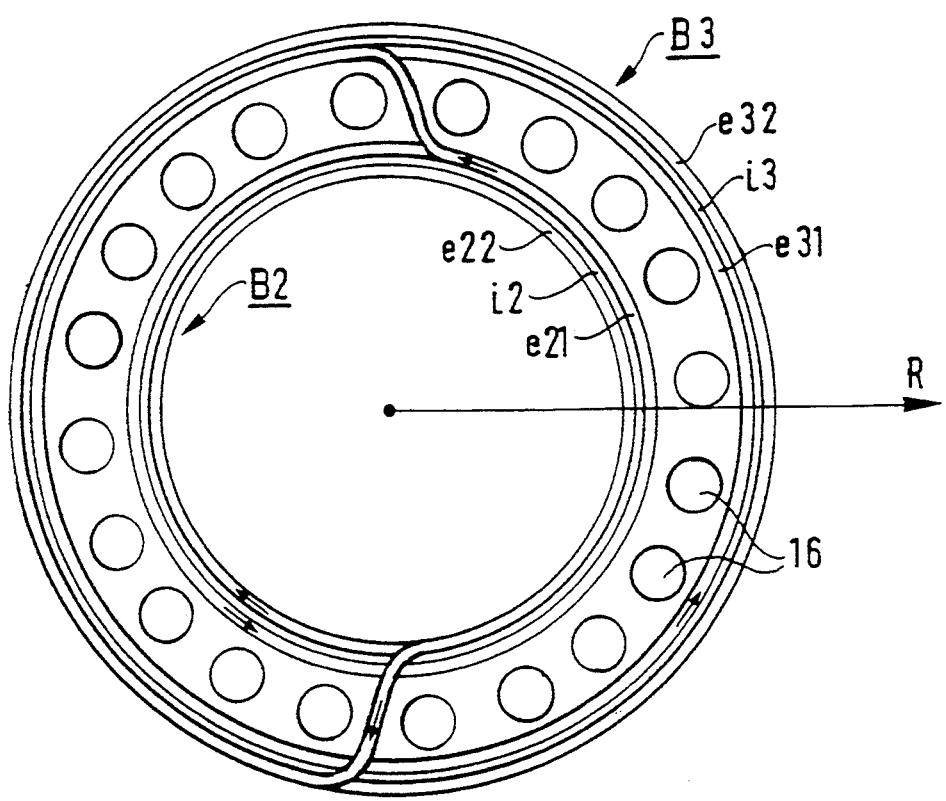
FIG. 5 is a diagram showing how the windings of two adjacent coils are wound.

FIG. 5 shows how the wires of two adjacent coils are wound, for example coils B2 and B3 which carry the windings e21, e22 and e31, e32 respectively. These are joined at one of the apexes of the coil assembly. The leakage flux of such a coil assembly is extremely small, so that the losses due to currents induced in the cryostat are negligible.

Figure 6:
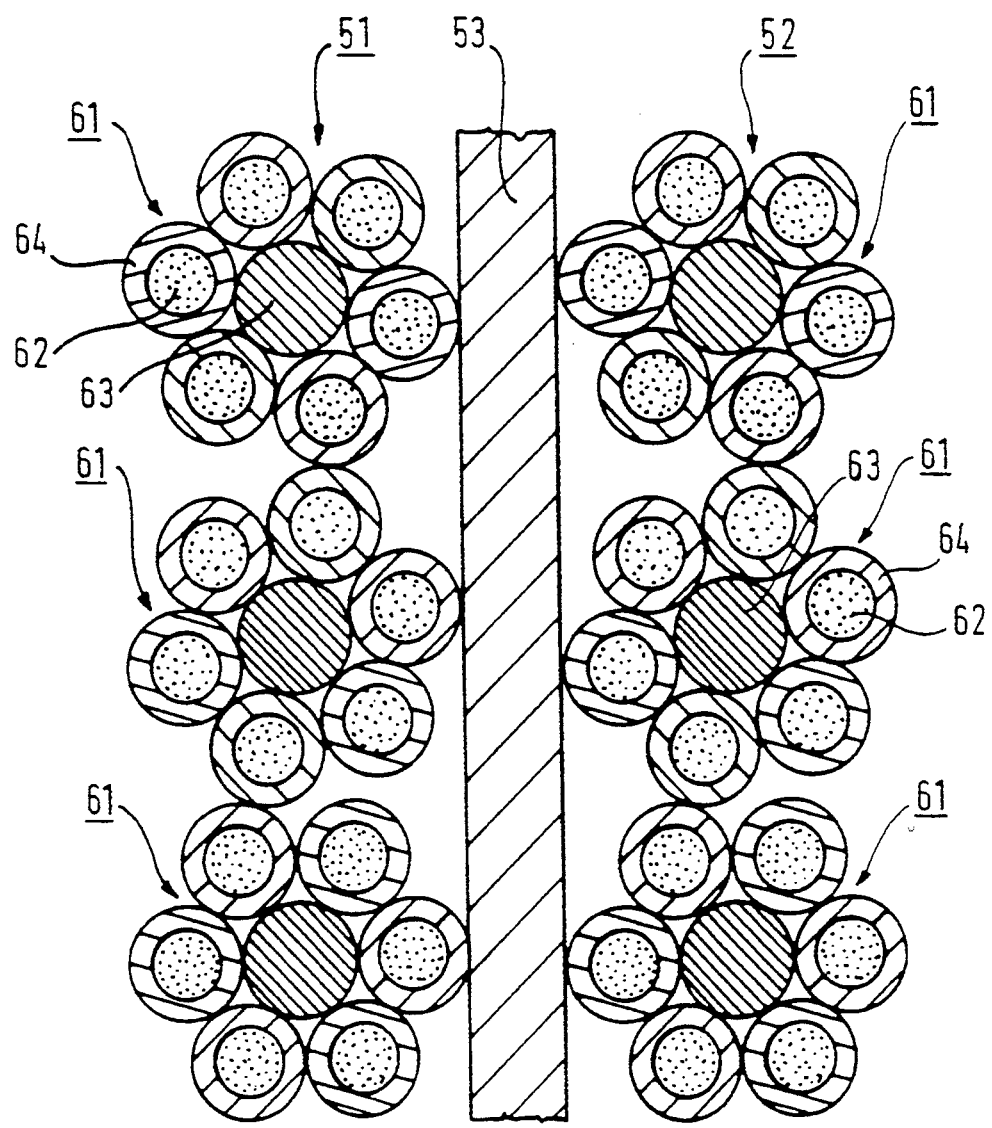
FIG. 6 is a schematic view of a coil comprising two sheets of superconductive wires, the constituent strands of which are covered, in accordance with the invention, with a material having a resistivity in the radial direction lying in the range 0.1 $\Omega.m$ to 10 $\Omega.m$.

FIG. 6 shows a variant on the invention.

The coil assembly, part of which is shown in FIG. 6, comprises two sheets 51 and 52, wound as touching turns, the windings being in opposite directions and optionally separated by a thin layer 53. The superconductive wires 61 used in the example of FIG. 6 are wires of the type known as 6+1, comprising six superconductive strands referenced 62 assembled around a resistive strand 63 constituting a central core.

In accordance with the invention, before being made up into the wire, each of the strands 62 is insulated by a sheath 64 of a material having a resistivity in the radial direction lying in the range 0.1 $\Omega.m$ to 10 $\Omega.m$, the material advantageously being a polymer filled with carbon black.

In an example in which the wire 62 has a diameter of 0.5 mm, the thickness of the sheath lies in the range 0.1 mm to 0.2 mm, so that the sheathed wire has a diameter lying in the range 0.7 mm to 0.9 mm.

Advantageously, the optional layer 53 separating the sheets is of the same material.

The arrangement of two closely adjacent sheets 51 and 52 wound in opposite directions gives the coil assembly a self-inductance value that is very close to zero, so that in the superconductive state, there is almost no voltage between turns or between sheets. The partial insulation given by the sheath 64 of the wires and by the layer 53 is sufficient to avoid currents circulating between the superconductive strands of a wire, between the core and the superconductive strands, or between the two sheets.

When a transition develops, the transfer of currents between strands, between turns and between sheets produces a Joule effect which accelerates the propagation of said transition; the partially conductive nature of the sheath 64 avoids excessive voltages appearing between strands or sheets, which, if the insulation were conventional, could lead to breakdowns. The existence of local insulation faults (if any) would be of little consequence in contrast to conventional insulation.

When the coil assembly is in the current limiting phase, insulation between strands and between sheets is unnecessary. The sheaths 64 produce sufficient resistance between turns that the limiting effect is not compromised.

The use of polymer filled with carbon black as sheathing gives the additional advantage of improving the mechanical cohesion of the wire.

Although the example described is based on the use of a 6+1 type wire, the invention is clearly not limited to that type, and all types of wire may be used, such as N+1 wires or Roebel bars.

The invention is particularly applicable to the construction of medium and high voltage current limiters.

We claim:

1. A superconductive coil assembly which may be used particularly for a current limiter, the coil assembly comprising at least one coil comprising two sets of superconductive wires wound as touching turns and in opposite directions, each of said superconductive wires comprising a plurality of strands, wherein each strand is covered with a layer of material which has a resistivity in the radial direction lying in the range 0.1 $\Omega.m$ to 10 $\Omega.m$.

2. A coil assembly according to claim 1, wherein the layer of material has a thickness lying in the range 0.1 mm to 0.2 mm.

3. A coil assembly according to claim 1, wherein the two sets of superconductor wires are separated by a layer of a material which has a transverse resistivity lying in the range 0.1 $\Omega.m$ to 10 $\Omega.m$.

* * * * *